United States Patent [19]

Lipps

[11] 4,021,932
[45] May 10, 1977

[54] AUDIOVISUAL DEVICE

[76] Inventor: Edwin A. Lipps, 205 Chautauqua Ave., Pacific Palisades, Calif. 90272

[22] Filed: July 31, 1975

[21] Appl. No.: 600,732

[52] U.S. Cl. .............................. 35/8 A; 35/35 C; 360/93

[51] Int. Cl.$^2$ .......................................... G09B 5/06

[58] Field of Search ............ 35/8 A, 35 C; 360/93; 274/11; 40/28.1; 281/29, 31, 36, 50

[56] References Cited

UNITED STATES PATENTS

| | | | |
|---|---|---|---|
| 3,319,012 | 5/1967 | Reed et al. | 360/93 |
| 3,322,906 | 5/1967 | Rothman | 360/93 |
| 3,340,369 | 9/1967 | Seidl | 360/93 |
| 3,641,684 | 2/1972 | Paige | 35/8 A |

*Primary Examiner*—William H. Grieb
*Attorney, Agent, or Firm*—Mahoney, Schick & Cislo

[57] ABSTRACT

An amusement and educational audiovisual device consisting of what is commonly referred to in the art as a talking book and a playback device adapted to be utilized in conjunction with a plurality of different talking books. The talking book of the invention is of book-like appearance and includes a front cover and such printed material as may be necessary to convey the visual message intended. Appended to the front cover and printed material is the back portion of the talking book which consists of a tape container. The tape container is provided with an opening therein adapted to receive the transducer head and capstan of the playback device and is of such simple construction as to be usable by very young or handicapped children. Various types of biasing means are provided in the alternative embodiments of the talking book and playback device to insure registry of the tape with the transducer head and capstan drive of the playback device.

2 Claims, 5 Drawing Figures

AUDIOVISUAL DEVICE

BACKGROUND OF THE INVENTION

Audiovisual education or experience entails the simultaneous utilization of the visual and auditory factors and educators have discovered that the simultaneous exercise of these faculties results in greater progress by a child or other individual utilizing facilities embodying the capability of simultaneously presenting visual images and auditory input.

This is particularly true in the education of underprivileged children, young children and children suffering from various forms of inadequate visual or auditory response.

Various types of devices have been provided in the prior art to accomplish the audiovisual exposure of individuals including, at one end of the spectrum, expensive electronic teaching equipment intended for intensive use in schools and other institutions of learning and, at the other end of the spectrum, phonograph records presented in conjunction with printed material corresponding to the auditory input of the phonograph records.

Also provided by the prior art are various forms of talking books including books having a phonograph envelope incorporated therein; books having a receptacle for a relevant tape cassette; and books incorporating a specialized form of playback device adapted to receive an especially designed tape cassette.

One of the major disadvantages encountered with the record type of talking books is the necessity for a separate record player whose utilization and operation entail relative sophistication on the part of the child utilizing the record type talking book. This objection also applies to the tape cassette type talking book wherein the tape must be utilized in conjunction with a separate tape playing device of conventional construction and relative sophistication. In addition, there is the added factor of the considerable expense of such conventional types of tape players.

Finally, the special device incorporating a built-in tape player in the book and a specially designed and constructed tape cartridge adapted to be utilized in conjunction with said player poses both problems of expense and utilization since extensive manipulation of the tape player and special tape in conjunction with a specific book is entailed, activities which are frequently beyond the manipulative skills of very young, underprivileged or handicapped children.

OBJECTS AND ADVANTAGES OF THE INVENTION

It is, therefore, a primary object of the invention to provide an audiovisual device consisting of two interchangeable components, namely, a talking book and an associated tape playing device adapted to be utilized with the talking book and other talking books constructed in accordance with the teachings of this invention.

It is a primary object of the invention to provide a device of the aforementioned character which is so constructed and operated that it is capable of utilization by extremely young, disadvantaged or handicapped children. This is particularly the case because the talking book and an integral tape container provided therewith are so designed as to be readily mounted in association with the specifically designed tape player adapted to be utilized in conjunction therewith.

A further object of the invention is the provision of the device of the aforementioned character wherein the talking book consists of a front cover, printed material and a rear portion or cover incorporating a tape container of approximately the same size as the body of the book. Incorporated in the tape container is a tape which bears a message relevant to the printed or illustrative material incorporated in the book.

An additional object of the invention is the provision of a device of the aforementioned character wherein the aforesaid talking book incorporates a container having a tape translating and transducer head receiving opening therein adapted to receive the tape translating capstan and transducing head of the associated tape player therein. The tape player is specifically designed so that the head and capstan may be readily inserted in the aforesaid opening with a minimal exercise of manipulative skills and, therefore, the device may be operated by individuals of limited manipulative skills.

A further object of the invention is the provision of interlock and locating means between the tape container and the tape player whereby the tape container is automatically located in the proper position for tape translation on the tape player when it is installed thereupon.

An additional object of the invention is the provision of biasing means interposed between the tape container and tape player whereby the tape is urged against the adjacent transducer head and drive capstan of the tape player to insure the proper registration of the tape therewith.

Other objects and advantages of the invention will be apparent from the following specification and the accompanying drawings which are for the purpose of illustration only.

Figure 1:
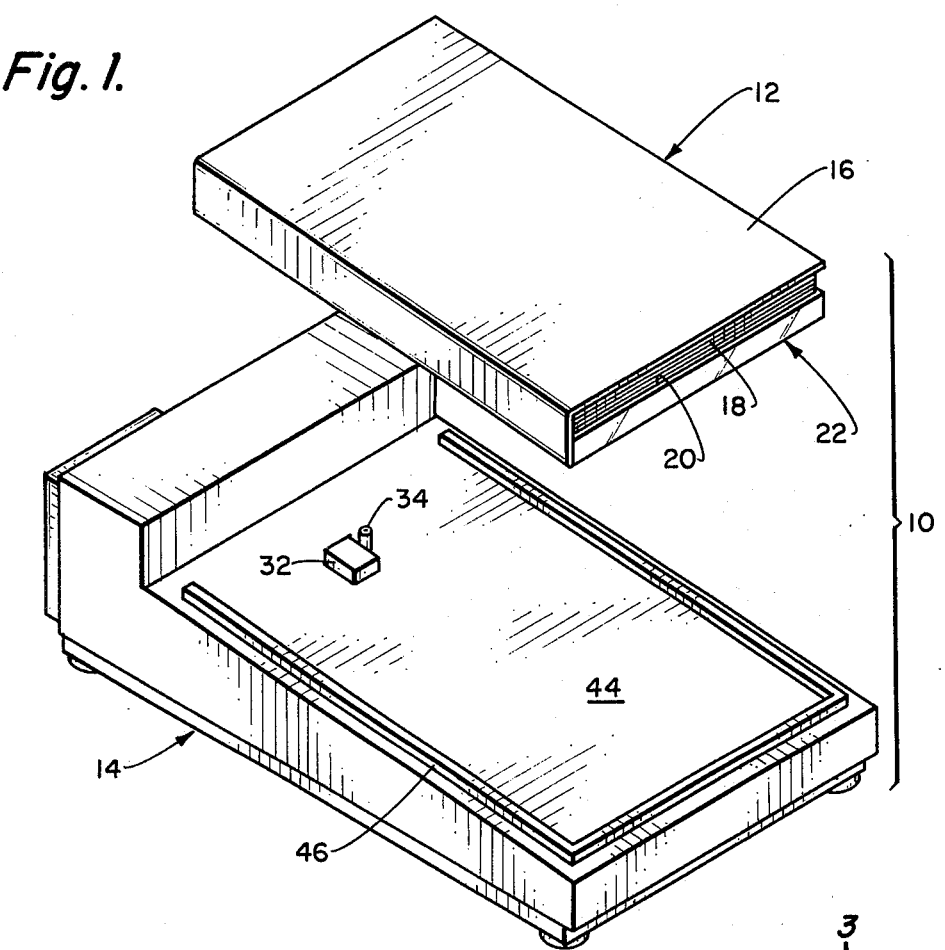
FIG. 1 is an isometric view generally showing the talking book and tape player which constitute the device of the invention.
Figure 2:
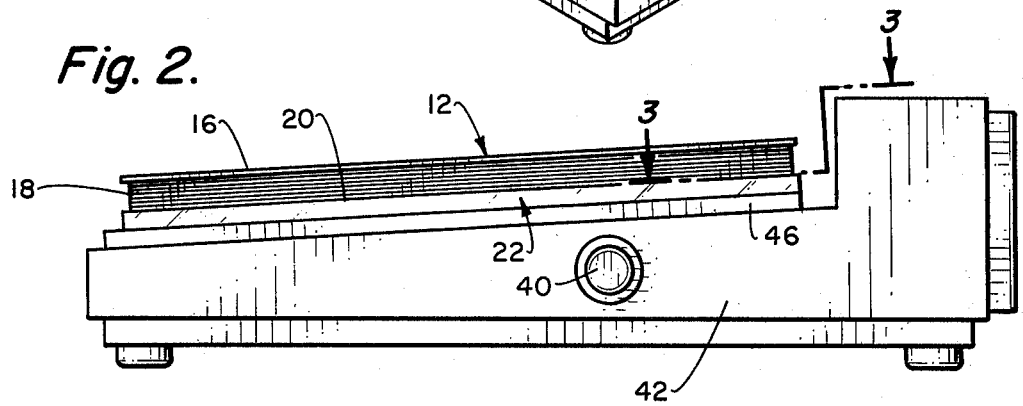
FIG. 2 is a side elevational view of the talking book in operative relationship with the tape player.
Figure 3:
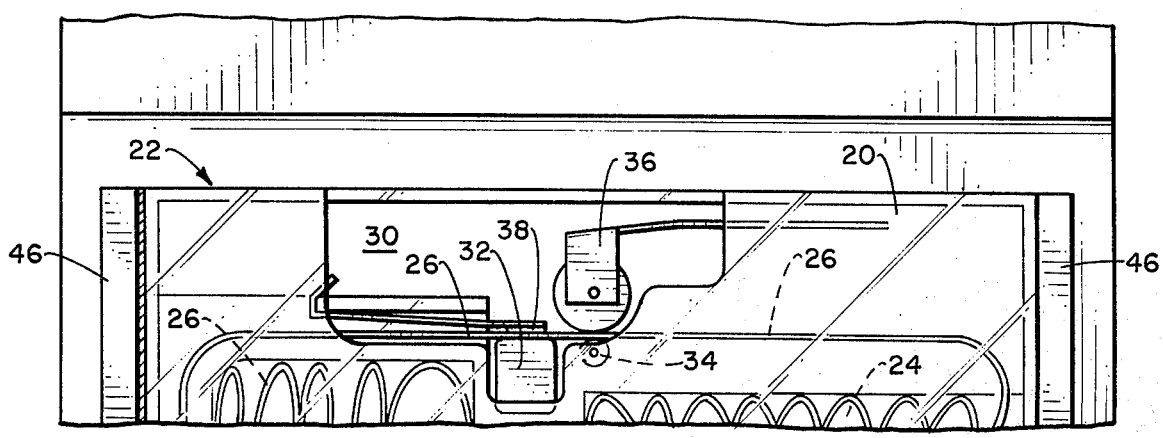
FIG. 3 is an enlarged fragmentary sectional view taken on the broken line 3—3 showing the tape biasing means incorporated in the tape container of the talking book.

DESCRIPTION OF THE BEST EMBODIMENTS CONTEMPLATED:

Referring to the drawings and particularly to FIGS. 1–3 thereof, I show an audiovisual device 10 incorporating the teachings of the invention and including as components thereof a talking book 12 and a playback tape player 14.

The talking book 12 includes a cover 16, one or more signatures or pages 18 of printed or illustrative material bound in any one of a plurality of conventional manners by conventional expedience and a back portion or cover 20 which is constituted by a tape container 22 formed from plastic or similar material and incorporating, as best shown in FIG. 3 of the drawings, a chamber 24 for the reception of an endless loop tape 26 which may have recorded thereupon auditory material relevant to, duplicative of or explanatory of the visual material presented in the printed matter 18 of the book 12.

Although I have disclosed a particular type of tape container incorporating a random loop tape therein, it will be obvious to those skilled in the art, that different types of tape arrangement may be utilized. However, I have found that the random loop tape and container therefor are the most economical for the intended purpose.

Incorporated in the upper edge of the talking book 12 tape container 22 is a relatively large opening 30 which, as best shown in FIG. 3 of the drawings, is adapted to receive the transducer head 32 and the drive capstan 34 of the tape playback device 14.

Mounted in operative relationship and carried upon the tape container 22 are a capstan backup roller 36 and a spring biased pressure pad 38, being respectively intended to urge the tape 26 against the associated drive capstan 34 and to maintain the tape in close contiguity with the transducer head 32.

The talking book magnetic recording tape may reproduce sound in sequence with the printed material contained in the talking book 12. On the other hand, it may contain educational material which extends beyond the written content of the printed material or may contain teaching or expository material illustrative of the printed content of the talking book 12.

The audio tape playback unit 14 is an inexpensive, lightweight table top player (which can incorporate a recording unit consisting of the drive capstan 34, the transducer head 32 and such other elements, not shown, as a drive motor for the capstan; loudspeaker; small amplifier). An on-off volume control switch 40 is provided on one side of the housing 42 of the playback tape player 14 and may be fabricated from plastic or other suitable material.

An inclined talking book receiving surface 44 is provided on the audio playback device and includes locating rails 46 adapted to receive and locate the tape container 22 and position it in such a position that the endless tape 26 is received in overlying relationship with the transducer head 32 and drive capstan 34 with the backup roller 36 and pressure pad 38 applying pressure to bring the tape into close contiguity with the drive capstan 34 and transducer head 32.

The playback tape player 14 may be powered by conventional dry cell batteries and an AC adapter can be provided for a 110-volt power source.

Figure 4:
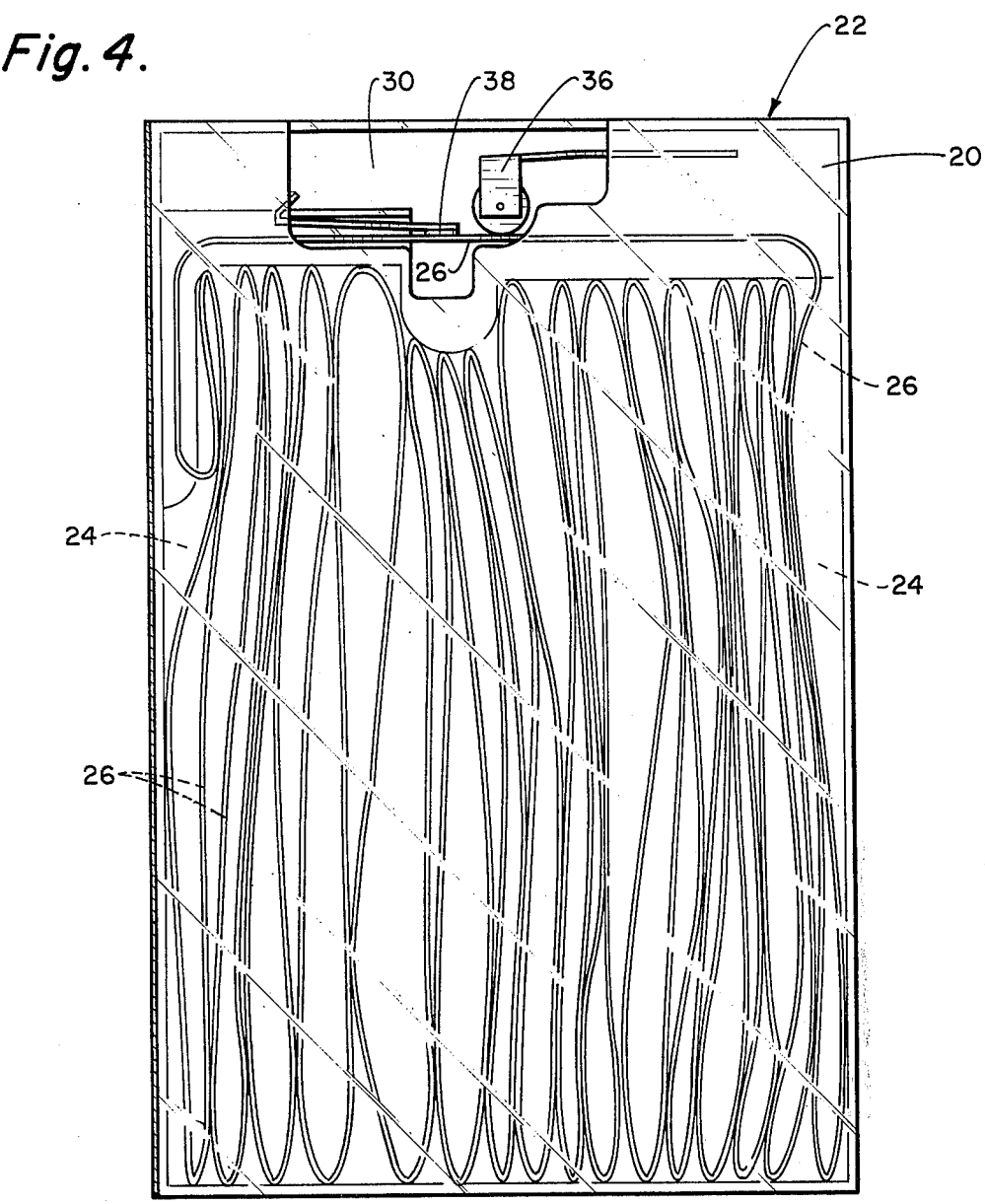
FIG. 4 is a top plan view of the back of the talking book illustrated in FIGS. 1-3.
Figure 5:
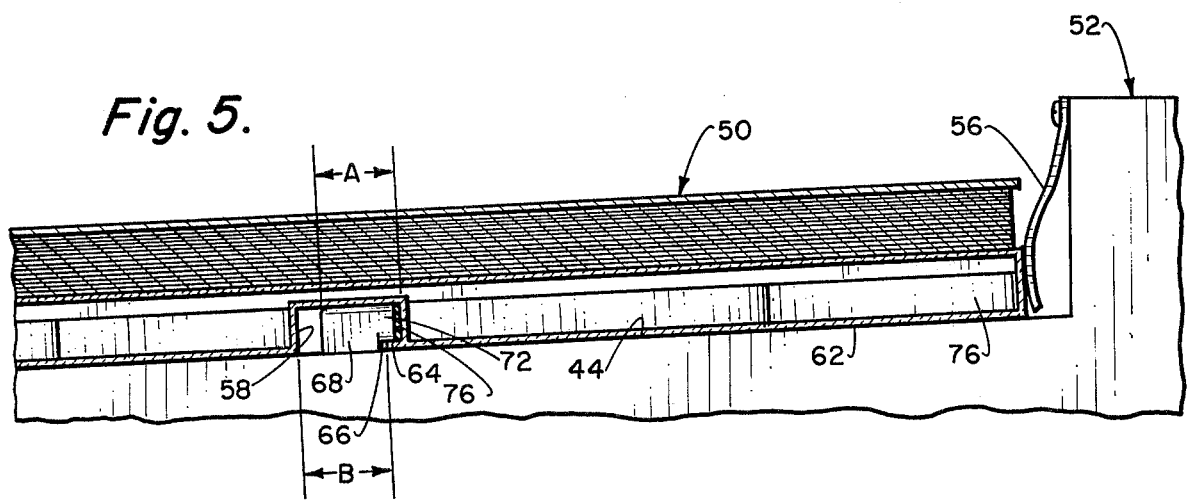
FIG. 5 is an enlarged sectional view of an alternative embodiment of the device showing interlock and biasing means provided on the talking book tape container and tape player to insure the proper registration of the tape with the transducer head of the tape player.

The complete tape container 22 is shown in plan view in FIG. 4 of the drawings, and an alternative form of the container 50 and playback player 52 is shown in FIG. 5 of the drawings. The devices 50 and 52 are basically similar in function to those previously described hereinabove with the exception that the playback device 52 incorporates spring means 56 constituted by a leaf spring which is biased against the upper extremity of the tape container 50 when the tape container 50 is located in operative relationship with the receptor surface 44 of the playback tape player 52.

An opening 58 is provided on the underside of the housing 62 of the tape container 50 and incorporates an interlocking or detent boss 64 cooperative with a similarly shaped receptacle 66 on the transducer head 68. The dimension of the opening 58 is such that the extension 72 of the head 68 can fit through the opening 58.

The spring 56 then engages the upper extremity of the container 50 and urges it downwardly to carry the tape 76 against the transducer head 72 and interlock the interlock portion 64 of the container in the interlock receptacle 66 of the head.

Therefore, a child or other user of the talking book has merely to place the transducer head 68 in the opening and the spring 56 on the playback device 52 will automatically urge the tape 76 into engagement with the transducer head 68 and the associated drive capstan, not shown.

The audiovisual device of the present invention is designed for use as an educational or entertainment device that small children can operate themselves at their own pace. It is compact, portable and lightweight so that a child can play it in its lap and the interlock feature, particularly, will maintain the talking book in operative relationship with the associated playback device despite alterations in the attitude of the device.

I claim:

1. An audiovisual device, the combination of: a book having a front cover and printed material secured to said front cover; a tape container secured in operative relationship with said front cover and said printed material to serve as the rear cover of said book, said tape container having an opening therein for the reception of a tape head; a playback device having a tape head and capstan drive upon a surface thereof adapted to receive said book and said container, said opening being adapted to receive said tape head and capstan drive whereby said tape can be played simultaneously with the reading or viewing of the contents of the printed matter in said book; and interlock means on said tape head and said container to facilitate the engagement of said tape with said tape head and to prevent inadvertent dislodgement of said tape container from operative engagement with said playback device.

2. An audiovisual device of the character defined in claim 1 in which said playback device incorporates biasing means to automatically urge said interlock means on said tape head and container into operative engagement with each other.

* * * * *